(No Model.)
P. R. JONES.
SPORTING TRAP.
No. 472,709.  Patented Apr. 12, 1892.
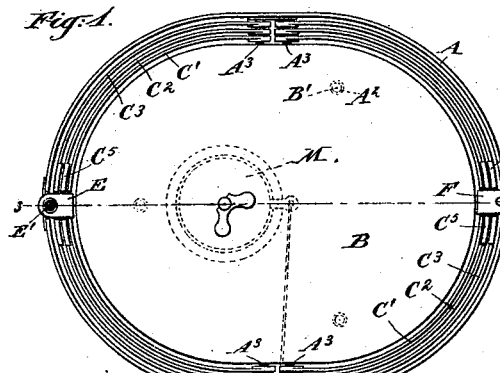
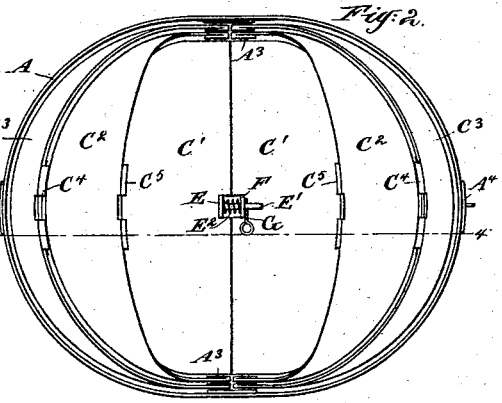
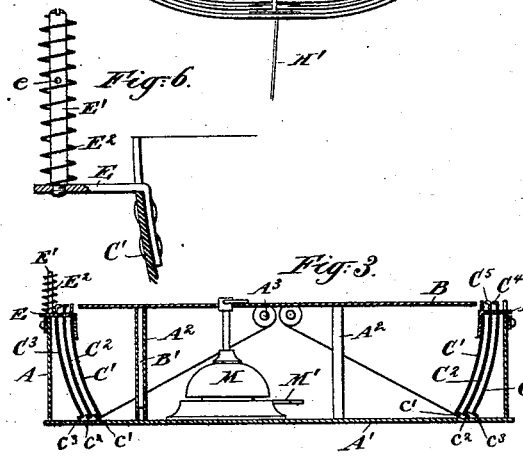
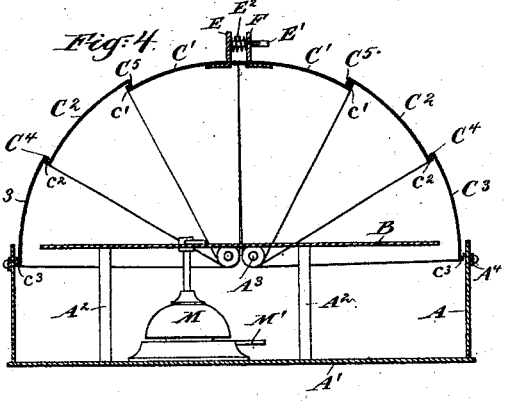
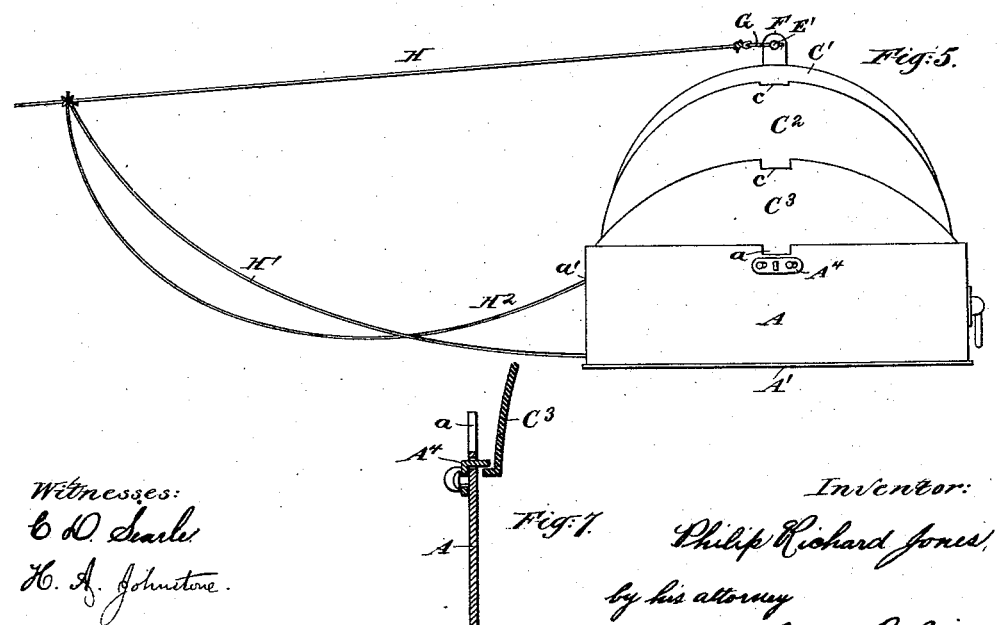
Witnesses:
C. D. Searle
H. A. Johnstone
Inventor:
Philip Richard Jones,
by his attorney
Charles R. Searle.

UNITED STATES PATENT OFFICE.

PHILIP R. JONES, OF LYNDHURST, NEW JERSEY.

SPORTING-TRAP.

SPECIFICATION forming part of Letters Patent No. 472,709, dated April 12, 1892.

Application filed January 20, 1892. Serial No. 418,662. (No model.)

*To all whom it may concern:*

Be it known that I, PHILIP RICHARD JONES, a subject of the Queen of Great Britain, residing at Lyndhurst, in the county of Bergen and State of New Jersey, have invented a certain new and useful Improvement in Sporting-Traps, of which the following is a specification.

My invention relates to that class of traps in which a live pigeon or other bird is confined to be liberated at the proper time and shot at by the sportsman. The failure of the bird to take flight upon being released causes great annoyance to the sportsman in shooting over any of the forms of traps heretofore known to me. My invention is intended to obviate this difficulty and insure the rise and flight of the bird on opening the liberating-walls of the trap. I provide a bell or other sound-producing device, which sounds when the releasing-cord is pulled and the trap opened, frightening the bird by the noise and causing it to leave the trap. The base of the trap is of circular or nearly circular form, with a surmounting hemispherical dome of nearly the same diameter as the base, made of overlapping sections. The bird is confined within the dome upon a horizontal platform. In releasing the bird the dome separates on the central line, the sections on each side falling into a space between the platform and the inclosing casing, leaving the platform clear. I prefer to mount the bell beneath the platform, to which latter the vibrations are communicated and assist materially in starting the bird.

The accompanying drawings form a part of this specification and represent what I consider the best means of carrying out the invention.

Figure 1 is a plan view showing the trap open. Fig. 2 is a corresponding view showing the trap closed and locked. Fig. 3 is a vertical section on the line 3 3 in Fig. 1. Fig. 4 is a vertical section on the line 4 4 in Fig. 2. Fig. 5 is a side elevation showing the trap closed.

Similar letters of reference indicate the same parts in all the figures in which they appear.

A is an upright casing of sufficiently-strong sheet metal of circular or slightly-elliptical form in plan, which, with the correspondingly-shaped bottom plate A', constitutes the fixed frame of the trap.

$A^2 A^2$ are upright tubular standards screwed into or otherwise securely fastened to the plate A', supporting the circular platform B, which latter is provided with downwardly-projecting pins B' B', matching telescopewise into the tubular supports $A^2$, securely holding the platform in position in the center of the casing, but with a sufficient annular space between the platform and the casing to allow certain portions to fall therein, as will be explained farther on. This construction allows the ready removal of the platform when necessary for the examination or repair of the parts within.

$A^3 A^3 A^3 A^3$ are pins extending inward from the casing A at two opposite points near the dividing-line of the dome on each side and extending across the space between the casing A and the platform a little below the surface of the latter. These pins $A^3$ serve as centers upon which the liberating walls or sections $C' C^2 C^3$ turn. These sections are portions of a hemisphere struck up by suitable dies or otherwise from sheet metal of the proper strength and thickness. I have used six of these sections to form the dome, three on each side of the central dividing-line. The lowermost sections $C^3$ have each a slight outwardly-projecting flange $c^3$ on the lower edge and an internal flange or lip $C^4$ on the upper edge, which latter is engaged by the external flange $c^2$ of the next and smaller section $C^2$, the internal lip $C^5$ of which is in turn engaged by a flange $c'$ on the lower edge of the uppermost and still smaller section $C'$. The sections are each successively smaller than the preceding ones, so as to fall or collapse one within the other in the space between the platform B and casing A, which latter is of such depth that the upper edges of the sections when down are about flush with the upper edge of the casing and also with the surface of the platform B. The upper edge of one of the sections $C'$ is provided at the center with a strong lug E, having a pin E' screwed therein and extending when the dome is closed across the dividing-line. It carries a spiral spring $E^2$, which exerts an expansive force against a corresponding lug F on the upper edge of the opposite section $C'$. This lug has a hole of sufficient size to allow the entrance of the pin E' and serves as an abutment for the spring $E^2$. A small hole $e$ is drilled at the proper point transversely through the pin E', in which the latch-pin G is thrust to lock the dome when the latter is closed. Thus conditioned, the spring $E^2$ is compressed between the lugs E and F, guided by the pin E', and the parts held in place by the latch-pin G. When the latch-pin is withdrawn by a sufficiently-strong pull on the releasing-cord H, attached to a ring on one end of the pin G, the spring $E^2$ asserts itself and forcibly separates the sections C' C' by a quick fling that will insure their falling and with them the others, by reason of their gravity, and also the fact that the sections on each side are struck each in turn by the lugs E and F, respectively, and forced down within the casing A. A notch $c$ is cut or otherwise formed in the upper edge of each of the sections, and corresponding notches $a$ $a$ are cut in the casing A to accommodate the lugs E and F and allow the upper edges of all of the sections on each side to lie flush with each other and with the casing. These notches also serve to hold the sections against displacement. Two sliding bolts $A^4$ on the casing engage or release the slight flange $c^3$ on the lower edge of each of the sections $C^3$ and insure that the dome when closed and locked shall not be displaced by accidental tilting or oscillating on the centers $A^3$ $A^3$.

To introduce the bird, it is only necessary to release one of the sections by sliding its bolt $A^4$ in the proper direction and raise its lower edge above the upper edge of the casing. This gives an ample opening through which the bird may be thrust. The section is then allowed to drop back into position, the bolt $A^4$ replaced in engagement, and the trap is ready to be sprung.

On the upper surface of the bottom plate A' is mounted a bell M, which by means of suitable clock-work contained in the bell-casing will ring so long as the lever M' is drawn forward or until the operating-spring (not shown) has "run down." To this lever is attached a branch cord H', extending out through a small hole in the casing A near the bottom and tied to the cord H at a little distance from the trap. Enough slack is allowed in this branch cord to insure the withdrawal of the latch-pin G before the strain of the pull comes directly upon the lever M', and to obviate the danger of breaking the bell mechanism a third cord $H^2$ is attached either to the main cord H or to the branch cord H' and tied to the casing A at any convenient point to take the strain when the releasing-cord is pulled taut. I have shown the cord $H^2$ attached to the casing at the point $a'$.

I provide a handle $A^6$, by which the trap may be conveniently carried in taking it to and from the field.

The bell will ring simultaneously with the collapsing of the dome or perhaps a little later, and will continue to ring so long as the cord is pulled taut, with the effect to startle the bird to immediate flight. The vibrations of the bell are communicated to the platform and, I believe, aid greatly in insuring the rise of the bird.

The trap is held against the force of the pull on the cord H by stakes driven into the ground contiguous to the casing and between the latter and the attendant whose duty it is to pull the cord and release the bird.

The pin E', with its attached spring, may be unscrewed from the lug E when the trap is to be packed for shipment, thus avoiding any projecting parts and allowing the whole to be packed economically and without risk of injury or disarrangement in transportation.

Modifications may be made by any good mechanic without departing from the principle or sacrificing the advantages of the invention. I may use one or two sections on each side instead of the three shown, or a greater number will serve. Other releasing devices may be used in place of the latch-pin G and pin E'. The bell may be attached to the under surface of the platform instead of upon the bottom plate A'. Other sound-producing devices may be employed. The hammer of the bell mechanism may be arranged to strike directly upon the bottom plate or upon the platform. Other means of supporting the platform may be employed instead of the tubular standards $A^2$. I prefer the whole, as shown.

I claim as my invention—

1. In a sporting-trap, the combination, with the casing and the gravitating collapsing sections, of a sounding device, a cord connecting with the liberating means for said sections, and a cord with sufficient slack connected with the sounding device and with said cord, as set forth.

2. In a sporting-trap, the combination, with the case and the pivoted overlapping gravitating sections, with means for normally holding the same distended to cover the case, of a sounding device within the case and having a lever, a cord connected with the holding means for the sections, and a cord connected with said lever and with said cord and having a limited amount of slack, substantially as and for the purpose specified.

3. In a sporting-trap, the sections C' $C^2$ $C^3$, falling one within the other and normally held distended, in combination with the casing A and with a sound-producing device, as the bell M, connected with and operated by the means that liberate the sections, substantially as herein specified.

4. In a sporting-trap, the collapsing sections C' $C^2$ $C^3$, in combination with the casing A, centers $A^3$ $A^3$, platform B, and bell M, connected with the section-liberating device, substantially as herein specified.

5. In a sporting-trap, the sections C' $C^2$ $C^3$, the engaging flanges $c'$ $c^2$ and lips $C^4$ $C^5$, and the centers $A^3$ $A^3$, in combination with each other and with the lugs on the uppermost sections, the pin E′, passed through said lugs, spring E², latch-pin G, passed through said pin E′, and the bolt A⁴, substantially as herein specified.

6. In a sporting-trap, the sections C′ C² C³, turning on the centers A³ A³, in combination with the casing A A′, platform B, pin E′, spring E², latch-pin G, the bell M, and cords H and H′, connected with the bell and with the pin G and with each other, all arranged to serve substantially as herein specified.

7. In a sporting-trap, the combination, with the case and the pivoted sections, the lower ones of which have flanges, of the movable bolt A⁴, engaging the said flange, whereby said section may be raised to introduce a bird, as set forth.

In testimony that I claim the invention above set forth I have affixed my signature in presence of two witnesses.

PHILIP R. JONES.

Witnesses:
A. HALLE,
EDWIN W. FOSTER.